C. M. HAYNES.
WHEEL AND METHOD OF MAKING THE SAME.
APPLICATION FILED OCT. 22, 1915.
1,269,179.
Patented June 11, 1918.
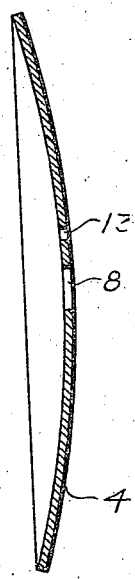
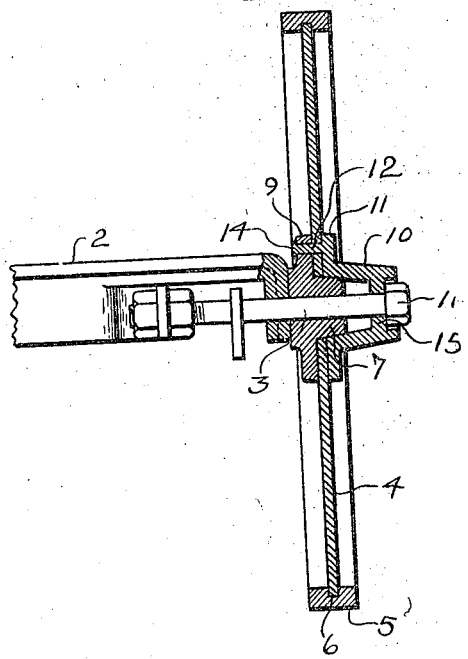
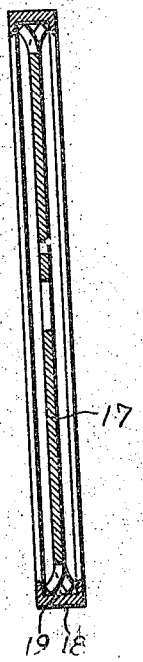
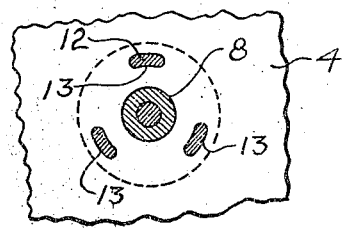
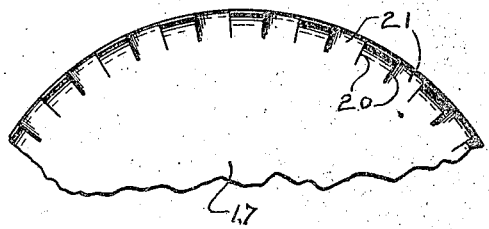
Witnesses
Otto Hilton
L. L. Markel
Inventor
Chas. M. Haynes.
By Heath Sutherland
Attorney

UNITED STATES PATENT OFFICE.

CHARLES M. HAYNES, OF NEWARK, NEW JERSEY.

WHEEL AND METHOD OF MAKING THE SAME.

1,269,179.  Specification of Letters Patent. Patented June 11, 1918.

Original application filed July 29, 1914, Serial No. 853,811. Divided and this application filed October 22, 1915. Serial No. 57,256.

*To all whom it may concern:*

Be it known that I, CHARLES M. HAYNES, a citizen of the United States, residing at Newark, in the county of Essex and State of New Jersey, have invented certain new and useful Improvements in Wheels and Methods of Making the Same, of which the following is a specification.

This invention relates to wheels and to a method of making the same. A wheel involving my invention is simple in construction, inexpensive to produce, and light yet thoroughly strong. By the method the wheel can be effectively, rapidly and easily made. The invention possesses other features of novelty and advantage which with the foregoing will be set forth at length in the following description. In this description I will set forth two of the several convenient forms of embodiment of the wheel and will also disclose a method, one of several, by which said wheel can be made. As will be inferred, I do not restrict myself to such disclosure; I may depart therefrom in several respects within the scope of the invention defined by the claim following said description.

Referring to the annexed drawings, constituting a part of the present specification:

Figure 1 is a view of an axle equipped with a wheel embodying the invention, the wheel being shown in section, a part of the axle being in section and the remainder in elevation.

Fig. 2 is an elevation of the central portion of the wheel from inside the same, a portion of the hub and axle structure being shown in transverse section.

Fig. 3 is a sectional view of a web for the wheel shown in Fig. 1 in dished condition.

Fig. 4 is a cross section of a different form of wheel.

Fig. 5 is a view in elevation of a portion of the web of the wheel illustrated in Fig. 4.

Like characters refer to like parts throughout the several views.

In Fig. 1 I have shown an axle 2 which may be of a kind disclosed in Letters Patent No. 1,108,169 issued to me August 25, 1914. The axle 2 is provided with a spindle 3 with which the wheel hereinafter described can be connected. As will be apparent this wheel may be connected with any other kind of axle or can be used in any of the connections where wheels are ordinarily utilized. The wheel shown in Fig. 1 comprises a web 4 and a rim or felly 5. The rim or felly 5 is interiorly channeled or grooved as at 6, the channel being circular and therefore, continuous. As represented it is disposed approximately midway of the width of the felly. This rim can be made in any desirable manner; I have found that it can be made of channel iron of standard character. That is to say a piece of channel iron of the requisite size will be selected and a proper length cut from it. This length will be formed into an annulus and the ends soldered, welded or otherwise suitably connected to present the rim 5, it being evident that the channel of the iron will be disposed inward.

The web 4 is preferably of resilient or bendable nature, and sheet metal answers satisfactorily in this connection. I cut from a sheet of such stock a circular body to produce the web, this web initially or when in the flat circular condition being of greater diameter than the inside diameter of the rim 5. After the felly or rim has been formed either in the way noted or in some other convenient manner, the web 4 will be symmetrically dished or bowed as shown in Fig. 3. The diameter of the bowed web is less than the internal diameter of the rim 5 so that the web in such condition can be introduced into the rim or felly 5. When the peripheral portion of the web 4 is opposite the channel or groove 6, the web will be straightened by a swaging or other suitable operation which results in projecting the marginal or rim portion of the web fully into the groove to thus firmly unite the web and the rim of the wheel. When the two parts are assembled as shown in Fig. 1, the peripheral portion of the web closely or snugly fits the groove, while the periphery of the web abuts solidly and substantially against the bottom of the groove. The bowing or dishing of the web can be secured in any desirable manner; for instance by a swaging operation. It will be clear that when the web is connected with the rim in the manner illustrated in Fig. 1, the web is expansively held in place and as may be inferred, this expansion of the rim can be obtained in different ways, one of which is as set forth by a swaging action.

The spindle 3 extends through the central opening of the sleeve 7. Said sleeve is externally tapered and extends through the central opening 8 of the web 4, the sleeve comparatively closely fitting said opening and having on its inner side an annular flange 9 overlying the inner face of the web 4 around the opening 8. This tapered sleeve 7 projects into the cap 10 provided with a flange 11 arranged opposite the flange 9 but fitting as will be obvious against the outer surface of the web or disk 4. The circular flange 11 is provided with several projections 12 extending through elongated arcuate openings 13 in the web or disk 4 and also through the flange 9, the projections 12 being headed at their inner ends over the inner surface of the flange 9. The sleeve 7 and cap 14 are, therefore, rigidly connected with each other and with the web 4 which they jointly clamp. The transverse wall 15 of the cap 11 is perforated for the passage of the spindle 3 provided at its outer end with a holding head 16 bearing against said wall. The wall 15 and sleeve 7 are separated to present a space or chamber in which is placed some suitable substance or packing which will be saturated with a suitable lubricant through a properly placed oil hole in the cap 10.

In Figs. 4 and 5 the wheel therein illustrated has a web 17 and a rim 18. This rim 18 may be also made of channel iron in the manner described in conjunction with the rim 5. The interior channel 19, however, of the rim 18 is wider than that of the rim 5. Originally the web or disk 17 is of concavo-convex form as shown in connection with the web 4 in Fig. 3. The peripheral portion of the web or disk 21 is made laterally or transversely adjustable to adapt the same to the width of the channel as 18 which is intended to receive it. This condition I can secure in several ways, for instance as illustrated by slitting the disk or web 17 inward from the periphery thereof as at 20 a short distance so as to produce ears or lugs as 21. After the rim or disk 17 is radially slit inward a short distance from its periphery in the manner alluded to, the resultant lugs or ears 21 are alternately deflected in opposite directions. Prior to assembling the web 17 and felly 18 the two sets of oppositely disposed lugs will be laterally adjusted by moving one set toward or from the other or by moving them both so that the span or spread of the two sets of lugs will conform practically to the width of the channel. When the lugs are thus adjusted the bowed or dished web 17 is introduced into the felly 18 in the manner already described until the toothed or lugged adjusted peripheral portion of the web is opposite the channel 18 when the web will be flattened in the manner already described so as to move the marginal portion of said web into the channel 18, the periphery of the web when the latter is flattened, impinging substantially against the bottom of the groove 18 and the opposite deflected teeth bearing firmly against the side walls of said groove so that the rim and felly will be securely connected. The present application is a division of my contemporaneously pending application Serial No. 853,811, filed July 29, 1914, now merged into Patent No. 1,161,049 of Nov. 23, 1915.

What I claim is:

A wheel comprising an internally grooved rim formed from channel iron, the groove of the rim facing inwardly, and a one-piece web in the rim, the width of the groove of the rim being greater than the thickness of the web, the latter having a plurality of peripheral resilient teeth formed by slitting the web inwardly, the teeth extending in opposite directions to each other, fitted in the groove and yieldingly engaging the side walls of said groove, to hold the parts assembled by the expansive effect of the web, and the latter being practically flat.

In testimony whereof I affix my signature in presence of two witnesses.

CHARLES M. HAYNES.

Witnesses:
DANIEL J. BRENNAN,
SAMUEL P. WATSON.